United States Patent
Guo et al.

(10) Patent No.: US 10,079,490 B2
(45) Date of Patent: Sep. 18, 2018

(54) METHOD AND DEVICE FOR DETERMINING SAFE THRESHOLD FOR POWER GRID VOLTAGE OF WIND FARM CONVERGING AREA

(71) Applicant: Tsinghua University, Beijing (CN)

(72) Inventors: Qinglai Guo, Beijing (CN); Hongbin Sun, Beijing (CN); Bin Wang, Beijing (CN); Boming Zhang, Beijing (CN); Wenchuan Wu, Beijing (CN); Tao Niu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 426 days.

(21) Appl. No.: 14/835,144

(22) Filed: Aug. 25, 2015

(65) Prior Publication Data
US 2016/0064931 A1    Mar. 3, 2016

(30) Foreign Application Priority Data
Aug. 26, 2014 (CN) .......................... 2014 1 0426310

(51) Int. Cl.
*H02J 3/12* (2006.01)
*H02J 3/38* (2006.01)
*H02J 3/18* (2006.01)

(52) U.S. Cl.
CPC ................. *H02J 3/12* (2013.01); *H02J 3/18* (2013.01); *H02J 3/386* (2013.01); *Y02E 10/763* (2013.01); *Y02E 40/30* (2013.01)

(58) Field of Classification Search
None
See application file for complete search history.

(56) References Cited

U.S. PATENT DOCUMENTS 7,346,462 B2 * 3/2008 Delmerico ......... G01R 19/2513
                                                                290/40 B
8,041,465 B2 * 10/2011 Larsen ..................... H02J 3/16
                                                                700/287

(Continued)

FOREIGN PATENT DOCUMENTS

CN         103368205 A    * 10/2013

OTHER PUBLICATIONS

Grudinin N, Reactive Power Optimization Using Successive Quadratic Programming Method, IEEE Transactions on Power Systems, 1998, 13:4, pp. 1219-1225.*

*Primary Examiner* — Alexander Satanovsky
*Assistant Examiner* — Lina Cordero
(74) *Attorney, Agent, or Firm* — Kile Park Reed & Houtteman PLLC (57) ABSTRACT

Disclosed are a method and a device for determining safe threshold for power grid voltage of a wind farm converging area, The method includes: obtaining ground state voltage; obtaining upper and lower limit voltage of the output bus, first lower and upper limit of reactive powers of fans and compensation devices, and lower and upper limit of active power fluctuations; obtaining second lower and upper limit of reactive powers of fans and compensation devices; determining whether voltage error is greater than a predetermined threshold; replacing the first lower and upper limit of the reactive powers of fans and the reactive powers of compensation devices with the second lower and upper limit of reactive powers of fans and compensation devices respectively, and repeating above steps if the voltage error is greater than the predetermined threshold, else defining the upper and lower limit voltage of the output bus as a safe threshold.

10 Claims, 2 Drawing Sheets

(56) References Cited

U.S. PATENT DOCUMENTS

| | | | |
|---|---|---|---|
| 9,030,043 B2* | 5/2015 | Garcia | F03D 9/005 307/43 |
| 9,624,905 B2* | 4/2017 | Perley | F03D 7/0292 |
| 2010/0106338 A1* | 4/2010 | Nam | G06F 1/305 700/292 |
| 2011/0156389 A1* | 6/2011 | Arlaban Gabeiras | H02J 3/1885 290/44 |
| 2015/0280629 A1* | 10/2015 | Diedrichs | H02J 3/24 290/44 |

* cited by examiner

METHOD AND DEVICE FOR DETERMINING SAFE THRESHOLD FOR POWER GRID VOLTAGE OF WIND FARM CONVERGING AREA

CROSS-REFERENCE TO RELATED APPLICATION

This application claims priority to and benefits of Chinese Patent Application No. 201410426310.X, filed with the State Intellectual Property Office of P. R. China on Aug. 26, 2014, the entire contents of which are incorporated herein by reference.

FIELD

The present disclosure relates to a field of a security and control of a power system, and more particularly relates to a method for determining a safe threshold for power grid voltage of a wind farm converging area and a device for determining a safe threshold for power grid voltage of a wind farm converging area.

BACKGROUND

In recent years, cascading trip-off of wind farms frequently occurs, thus bringing a challenge to security of wind farms, so that a voltage control of wind farms is particularly important. If the use of wind energy is mainly realized by sending wind energy into power grids on a large scale, since wind farms are located at end of a weak grid structure and wind power fluctuates widely, when a wind farm is tripped off, the other wind farms would be affected. However, a main network and wind farms are controlled by two different automatic voltage control systems and coordination control of the two systems is lacking, thus safe thresholds for voltages of the main network and wind farms are adjusted according to experience.

SUMMARY

According to embodiments of a first aspect of the present disclosure, there is provided a method for determining a safe threshold for power grid voltage of a wind farm converging area including: step A: obtaining a ground state voltage of an output bus of each wind farm in the wind farm converging area; step B: obtaining an upper limit voltage and a lower limit voltage of the output bus of each wind farm, a first lower limit and a first upper limit of reactive powers of fans in each wind farm, a first lower limit and a first upper limit of reactive powers of compensation devices in each wind farm, and a lower limit and an upper limit of active power fluctuations of the fans in each wind farm according to the ground state voltage of the output bus of each wind farm; step C: obtaining a second lower limit and a second upper limit of the reactive powers of the fans in each wind farm, a second lower limit and a second upper limit of the reactive powers of the compensation devices in each wind farm according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm; step D: obtaining a voltage error according to the upper limit voltage and the lower limit voltage of the output bus of each wind farm; step E: determining whether the voltage error is greater than a predetermined threshold; step F: replacing the first lower limit and the first upper limit of the reactive powers of the fans in each wind farm, and the first lower limit and the first upper limit of the reactive powers of the compensation devices in each wind farm with the second lower limit and the second upper limit of the reactive powers of the fans in each wind farm, the second lower limit and the second upper limit of the reactive powers of the compensation devices in each wind farm respectively, and repeating steps B-F to perform a time iteration, if the voltage error is greater than the predetermined threshold; step G: defining the upper limit voltage and the lower limit voltage of the output bus of each wind farm as a safe threshold of each wind farm, if the voltage error is less than or equal to the predetermined threshold.

According to embodiments of a second aspect of the present disclosure, there is provided a device for determining a safe threshold for power grid voltage of a wind farm converging area, including: a non-transitory computer-readable medium comprising computer-executable instructions stored thereon; and an instruction execution system, which is configured by the instructions to implement at least one of following modules: a first obtaining module, configured to obtain a ground state voltage of an output bus of each wind farm in the wind farm converging area; a second obtaining module, configured to obtain an upper limit voltage and a lower limit voltage of the output bus of each wind farm, a first lower limit and a first upper limit of reactive powers of fans in each wind farm, a first lower limit and a first upper limit of reactive powers of compensation devices in each wind farm, and a lower limit and an upper limit of active power fluctuations of the fans in each wind farm according to the ground state voltage of the output bus of each wind farm; a third obtaining module, configured to obtain a second lower limit and a second upper limit of the reactive powers of the fans in each wind farm, a second lower limit and a second upper limit of the reactive powers of the compensation devices in each wind farm according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm; a fourth obtaining module, configured to obtain a voltage error according to the upper limit voltage and the lower limit voltage of the output bus of each wind farm; a determining module, configured to determine whether the voltage error is greater than a predetermined threshold; an iteration module, configured to replace the first lower limit and the first upper limit of the reactive powers of the fans in each wind farm, and the first lower limit and the first upper limit of the reactive powers of the compensation devices in each wind farm with the second lower limit and the second upper limit of the reactive powers of the fans in each wind farm, the second lower limit and the second upper limit of the reactive powers of the compensation devices in each wind farm respectively, and to repeat to perform a time iteration, if the voltage error is greater than the predetermined threshold; a defining module, configured to define the upper limit voltage and the lower limit voltage of the output bus of each wind farm as a safe threshold of each wind farm, if the voltage error is less than or equal to the predetermined threshold.

According to embodiments of a third aspect of the present disclosure, there is provided a non-transitory computer-readable storage medium having stored therein instructions that, when executed by a processor of a computer, causes the computer to perform a method for determining a safe threshold for power grid voltage of a wind farm converging area, the method including: step A: obtaining a ground state voltage of an output bus of each wind farm in the wind farm converging area; step B: obtaining an upper limit voltage and a lower limit voltage of the output bus of each wind farm, a first lower limit and a first upper limit of reactive powers of fans in each wind farm, a first lower limit and a first upper limit of reactive powers of compensation devices in each wind farm, and a lower limit and an upper limit of active power fluctuations of the fans in each wind farm according to the ground state voltage of the output bus of each wind farm; step C: obtaining a second lower limit and a second upper limit of the reactive powers of the fans in each wind farm, a second lower limit and a second upper limit of the reactive powers of the compensation devices in each wind farm according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm; step D: obtaining a voltage error according to the upper limit voltage and the lower limit voltage of the output bus of each wind farm; step E: determining whether the voltage error is greater than a predetermined threshold; step F: replacing the first lower limit and the first upper limit of the reactive powers of the fans in each wind farm, and the first lower limit and the first upper limit of the reactive powers of the compensation devices in each wind farm with the second lower limit and the second upper limit of the reactive powers of the fans in each wind farm, the second lower limit and the second upper limit of the reactive powers of the compensation devices in each wind farm respectively, and repeating steps B-F to perform a time iteration, if the voltage error is greater than the predetermined threshold; step G: defining the upper limit voltage and the lower limit voltage of the output bus of each wind farm as a safe threshold of each wind farm, if the voltage error is less than or equal to the predetermined threshold.

The technical solutions provided by embodiments of the present disclosure have following advantageous effects.

(1) By both taking voltage security constraints of wind farms and a main network into account, when a wind farm is tripped off, the other wind farms continue to work normally. A safe threshold for power grid voltage may be calculated by a rapid iteration. The calculated safe threshold is robust to active powers of the wind farms, thus being beneficial to control the power grid voltage.

(2) Information exchange between the wind farms and a station of the wind farm converging area may be implemented by these technical solutions. Calculations in these technical solutions are small and rapid, which is beneficial to control the power grid voltage.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the present disclosure, it should be understood that, terms such as "first" and "second" are used herein for purposes of description, and are not intended to represent or indicate relative importance or significance or to represent or indicate numbers or locations. In the description of the present disclosure, it should be understood that, unless specified or limited otherwise, terms such as "connected" and "coupled" should be understood broadly, and may be, for example, fixed connections, detachable connections, or integral connections; or may be mechanical or electrical connections; or may be direct connections or indirect connections via intervening structures, which can be understood by those skilled in the art according to specific situations. Moreover, in the description of the present invention, unless specified otherwise, "a plurality of" means two or more than two.

Any process or method described in a flow chart or described herein in other ways may be understood to include one or more modules, segments or portions of codes of executable instructions for achieving specific logical functions or steps in the process. Although the flow chart shows a specific order of execution, it is understood that the order of execution may differ from what is depicted. For example, the order of execution of two or more boxes may be scrambled relative to the order shown.

In the following, a method for determining a safe threshold for power grid voltage of a wind farm converging area according to embodiments of the present disclosure will be described in detail with reference to drawings.

Figure 1:
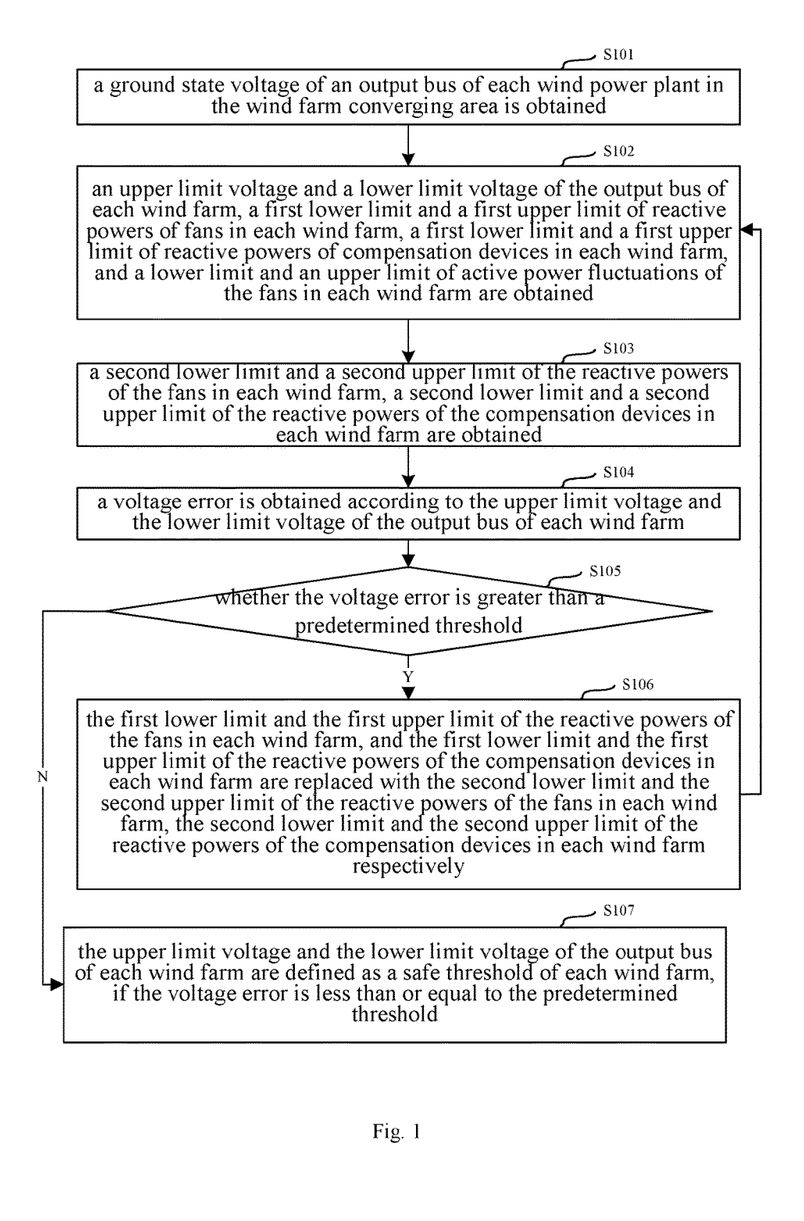
FIG. 1 is a flow chart of the method for determining a safe threshold for power grid voltage of a wind farm converging area according to embodiments of the present disclosure.

As shown in FIG. 1, FIG. 1 is a flow chart of the method for determining a safe threshold for power grid voltage of a wind farm converging area according to embodiments of the present disclosure. The method for determining a safe threshold for power grid voltage of a wind farm converging area includes following steps.

At step S101: a ground state voltage of an output bus of each wind farm in the wind farm converging area is obtained.

In an embodiment, step S101 may include following steps.

1. Each reactive power of each fan in each wind farm is set to be 0, and each reactive power of each compensation device in each wind farm is set to be 0.

2. The ground state voltage of the output bus of each wind farm is obtained by performing a ground state flow power calculation.

At step S102: an upper limit voltage and a lower limit voltage of the output bus of each wind farm, a first lower limit and a first upper limit of reactive powers of fans in each wind farm, a first lower limit and a first upper limit of reactive powers of compensation devices in each wind farm, and a lower limit and an upper limit of active power fluctuations of the fans in each wind farm are obtained according to the ground state voltage of the output bus of each wind farm.

In an embodiment, step S102 may include following steps.

1. In order to ensure the fans in each wind farm can not be tripped off the power grid in a normal operation, a first objective function (1) of the upper limit voltage of the output bus of each wind farm and a second objective function (2) of the lower limit voltage of the output bus of each wind farm are established:

$$\overline{V_{PCC,i}} = \min_{\Delta p_{w_i}} \min_{\Delta q_{w_i}, \Delta q_{c_i}} V_{PCC,i}^0 + \qquad (1)$$

$$\sum_{j \in w_i} \left( \frac{\partial V_{PCC,i}^0}{\partial p_{i,j}} \Delta p_{i,j} + \frac{\partial V_{PCC,i}^0}{\partial q_{i,j}} \Delta q_{i,j} \right) + \sum_{j \in c_i} \frac{\partial V_{PCC,i}^0}{\partial q_{i,k}} \Delta q_{i,k}$$

$$\underline{V_{PCC,i}} = \min_{\Delta p_{w_i}} \min_{\Delta q_{w_i}, \Delta q_{c_i}} V_{PCC,i}^0 + \qquad (2)$$

$$\sum_{j \in w_i} \left( \frac{\partial V_{PCC,i}^0}{\partial p_{i,j}} \Delta p_{i,j} + \frac{\partial V_{PCC,i}^0}{\partial q_{i,j}} \Delta q_{i,j} \right) + \sum_{k \in c_i} \frac{\partial V_{PCC,i}^0}{\partial q_{i,k}} \Delta q_{i,k}$$

where $\overline{V_{PCC,i}}$ is an upper limit voltage of the output bus of a $i^{th}$ wind farm, $\underline{V_{PCC,i}}$ is a lower limit voltage of the output bus of the $i^{th}$ wind farm, $V_{PCC,i}^0$ is a ground state of the $i^{th}$ wind farm, $w_i$ is a set of fans in the $i^{th}$ wind farm, $c_i$ is a set of compensation devices in the $i^{th}$ wind farm, $$\frac{\partial V_{PCC,i}^0}{\partial p_{i,j}} \text{ and } \frac{\partial V_{PCC,i}^0}{\partial q_{i,j}}$$

represent a voltage sensitivity coefficient of an active power of a $j^{th}$ fan in the $i^{th}$ wind farm relative to $V_{PCC,i}^0$ and a voltage sensitivity coefficient of a reactive power of the $j^{th}$ fan in the $i^{th}$ wind farm relative to $V_{PCC,i}^0$ respectively, $$\frac{\partial V_{PCC,i}^0}{\partial q_{i,k}}$$

represents a voltage sensitivity coefficient of a reactive power of a $k^{th}$ compensation device in the $i^{th}$ wind farm relative to $V_{PCC,i}^0$, $\Delta p_{i,j}$ and $\Delta q_{i,j}$ represent a variation of the active power of the $j^{th}$ fan in the $i^{th}$ wind farm and a variation of the reactive power of the $j^{th}$ fan in the $i^{th}$ wind farm respectively, $\Delta q_{i,k}$ represents a variation of the reactive power of the $k^{th}$ compensation device in the $i^{th}$ wind farm.

2. first boundary conditions (3) for the first objective function and the second objective function is determined:

$$\text{s.t. } \underline{V_{i,t}^0} \leq V_{i,t}^0 + \sum_{j \in w_i} \left( \frac{\partial V_{i,t}^0}{\partial p_{i,j}} \Delta p_{i,j} + \frac{\partial V_{i,t}^0}{\partial q_{i,j}} \Delta q_{i,j} \right) + \qquad (3)$$

$$\sum_{k \in c_i} \frac{\partial V_{i,t}^0}{\partial q_{i,k}} \Delta q_{i,k} \leq \overline{V_{i,t}^0}, \ t \in w_i$$

-continued $$\underline{\Delta p_{i,t}} \leq \Delta p_{i,t} \leq \overline{\Delta p_{i,t}}, \ t \in w_i$$

$$\underline{\Delta q_{i,t}} \leq \Delta q_{i,t} \leq \overline{\Delta q_{i,t}}, \ t \in w_i$$

$$\underline{\Delta q_{i,k}} \leq \Delta q_{i,k} \leq \overline{\Delta q_{i,k}}, \ k \in c_i$$

$$\underline{\Delta Q_{wi}} \leq \sum_{t \in w_i} \Delta q_{i,t} \leq \overline{\Delta Q_{wi}}$$

$$\underline{\Delta Q_{ci}} \leq \sum_{k \in c_i} \Delta q_{i,k} \leq \overline{\Delta Q_{ci}}$$

where $\underline{V_{i,t}^0}$ and $\overline{V_{i,t}^0}$ represent a lower limit voltage and upper limit voltage in a normal operation of a $t^{th}$ fan in the $i^{th}$ wind farm respectively, $t \neq j$, $$\frac{\partial V_{i,t}^0}{\partial p_{i,j}} \text{ and } \frac{\partial V_{i,t}^0}{\partial q_{i,j}}$$

represent a voltage sensitivity coefficient of the active power of the $j^{th}$ fan in the $i^{th}$ wind farm relative to the $t^{th}$ fan and a voltage sensitivity coefficient of the reactive power of the $j^{th}$ fan in the $i^{th}$ wind farm relative to the $t^{th}$ fan respectively, $$\frac{\partial V_{i,t}^0}{\partial q_{i,k}}$$

represents a voltage sensitivity coefficient of the reactive power of the $k^{th}$ compensation device in the $i^{th}$ wind farm relative to the $t^{th}$ fan, $\underline{\Delta p_{i,t}}$ and $\overline{\Delta p_{i,t}}$ represent a lower limit and an upper limit of an active power fluctuation of the $t^{th}$ fan in the $i^{th}$ wind farm respectively, $\underline{\Delta q_{i,t}}$ and $\overline{\Delta q_{i,t}}$ represent a lower limit and an upper limit of a reactive power fluctuation of the $t^{th}$ fan in the $i^{th}$ wind farm respectively, $\underline{\Delta q_{i,k}}$ and $\overline{\Delta q_{i,k}}$ represent a lower limit and an upper limit of a reactive power fluctuation of the $k^{th}$ compensation device in the $i^{th}$ wind farm respectively, $\underline{\Delta Q_{wi}}$ and $\overline{\Delta Q_{wi}}$ represent a lower limit and an upper limit of reactive powers of fans in the $i^{th}$ wind farm, $\underline{\Delta Q_{ci}}$ and $\overline{\Delta Q_{ci}}$ represent a lower limit and an upper limit of reactive powers of compensation devices in the $i^{th}$ wind farm;

3. a lower limit of the active power fluctuation of the $i^{th}$ wind farm is calculated according to formula (4):

$$\underline{\Delta P_i} = \sum_{t \in w_i} \underline{\Delta p_{i,t}}, \qquad (4)$$

and an upper limit of the active power fluctuation of the $i^{th}$ wind farm according to formula (5):

$$\overline{\Delta P_i} = \sum_{t \in w_i} \overline{\Delta p_{i,t}}, \qquad (5)$$

where $\underline{\Delta P_i}$ and $\overline{\Delta P_i}$ represent the lower limit and the upper limit of the fluctuation of the active power of the $i^{th}$ wind farm respectively.

4. the first objective function and the second objective function is resolved based on the first boundary conditions to obtain obtain the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm.

At step S103: a second lower limit and a second upper limit of the reactive powers of the fans in each wind farm, a second lower limit and a second upper limit of the reactive powers of the compensation devices in each wind farm are obtained according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm.

In an embodiment, step S103 may include following steps.

1. A third objective function (6) of reactive power in the wind farm converging area is established according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuation of the fans in each wind farm:

$$\Delta Q = \max_{\Delta P} \min_{\Delta Q_{wi}, \Delta Q_{ci}} \sum_{i \in w} (\Delta Q_{wi}^{max} - \Delta Q_{wi}^{min}) + \sum_{i \in w} (\Delta Q_{ci}^{max} - \Delta Q_{ci}^{min}) \quad (6)$$

where $\Delta Q_{wi}^{max}$ and $\Delta Q_{wi}^{min}$ represent a second lower limit and a second upper limit of reactive powers of fans in the $i^{th}$ wind farm, $\Delta Q_{ci}^{max}$ and $\Delta Q_{ci}^{min}$ represent a second lower limit and a second upper limit of reactive powers of compensation devices in the $i^{th}$ wind farm.

2. Second boundary conditions (7) for the third objective function are determined:

$$\text{s.t. } \underline{V_{PCC,i}} \leq V_{PCC,i}^0 + \sum_{n \in w_i} \left( \frac{\partial V_{PCC,i}^0}{\partial p_{i,n}} \Delta P_n + \frac{\partial V_{PCC,i}^0}{\partial Q_{i,n}} \Delta Q_n \right) \leq \overline{V_{PCC,i}}, i \in w \quad (7)$$

$$\underline{V_{PCC,i}} \leq V_{PCC,i}^0 + \sum_{n \in w, n \neq s} \left( \frac{\partial V_{PCC,i}^0}{\partial P_n} \Delta P_n + \frac{\partial V_{PCC,i}^0}{\partial Q_n} \Delta Q_n \right) +$$

$$\frac{\partial V_{PCC,i}^0}{\partial P_s} \Delta P_s^s + \frac{\partial V_{PCC,i}^0}{\partial Q_s} \Delta Q_s^s \leq \overline{V_{PCC,i}}, i \in w, i \neq s, \in S$$

$$\underline{\Delta P_i} \leq \Delta P_i \leq \overline{\Delta P_i}, i \in w$$

$$\underline{\Delta Q_{wi}} \leq \Delta Q_{wi}^{min} \leq \Delta Q_{wi} \leq \Delta Q_{wi}^{max} \leq \overline{\Delta Q_{wi}}, i \in w$$

$$\underline{\Delta Q_{ci}} \leq \Delta Q_{ci}^{min} \leq \Delta Q_{ci} \leq \Delta Q_{ci}^{max} \leq \overline{\Delta Q_{ci}}, i \in w$$

where $$\frac{\partial V_{PCC,i}^0}{\partial P_n} \text{ and } \frac{\partial V_{PCC,i}^0}{\partial Q_n}$$

represent a voltage sensitivity coefficient of an active power of a $n^{th}$ wind farm relative to the output bus of the $i^{th}$ wind farm and a voltage sensitivity coefficient of a reactive power of the $n^{th}$ wind farm relative to the output bus of the $i^{th}$ wind farm respectively, $\Delta P_n$ and $\Delta Q_n$ represent a variation of the active power of the $n^{th}$ wind farm and a variation of the reactive power of the $n^{th}$ wind farm respectively, $n \neq i$, w is a set of wind farms in the wind farm converging area, S is a set of tripped off wind farms, $\Delta P_s^s$ and $\Delta Q_s^s$ represent a variation of active powers of tripped off wind farms and a variation of reactive powers of tripped off wind farms respectively.

3. The third objective function is resolved based on the second boundary conditions to obtain the second lower limit and the second upper limit of the reactive powers of the fans in each wind farm, the second lower limit and the second upper limit of the reactive powers of the compensation devices in each wind farm.

At step S104, a voltage error is obtained according to the upper limit voltage and the lower limit voltage of the output bus of each wind farm.

The voltage error may be obtained according to formula (8):

$$\Delta V_S = \sum_{i \in w} \left| \overline{V_{PCC,i}^{(m+1)}} - \overline{V_{PCC,i}^{(m)}} \right| + \sum_{i \in w} \left| \underline{V_{PCC,i}^{(m+1)}} - \underline{V_{PCC,i}^{(m)}} \right| \quad (8)$$

where $\overline{V_{PCC,i}}^{(m)}$ is an upper limit voltage of the output bus of the $i^{th}$ wind farm in a $m^{th}$ time iteration and $\underline{V_{PCC,i}}^{(m)}$ is a lower limit voltage of the output bus of the $i^{th}$ wind farm in the $m^{th}$ time iteration.

At step S105, it is determined whether the voltage error is greater than a predetermined threshold.

A predetermined threshold ε is determined, it is determined whether $\Delta V_S$ is greater than ε.

At step S106, the first upper limit of the reactive powers of the fans in each wind farm, and the first lower limit and the first upper limit of the reactive powers of the compensation devices in each wind farm are replaced with second lower limit and the second upper limit of the reactive powers of the fans in each wind farm, the second lower limit and the second upper limit of the reactive powers of the compensation devices in each wind farm respectively, and steps S102-S107 are repeated to perform a time iteration, if the voltage error is greater than the predetermined threshold.

If $\Delta V_S$ is greater than ε, the first lower limit $\underline{\Delta Q_{wi}}$ and the first upper limit $\overline{\Delta Q_{wi}}$ of the reactive powers of the fans in each wind farm, and the first lower limit $\underline{\Delta Q_{ci}}$ and the first upper limit $\overline{\Delta Q_{ci}}$ of the reactive powers of the compensation devices in each wind farm are replace with the second lower limit $\Delta Q_{wi}^{min}$ and the second upper limit $\Delta Q_{wi}^{max}$ the reactive powers of the fans in each wind farm, the second lower limit $\Delta Q_{ci}^{min}$ and the second upper limit $\Delta Q_{ci}^{max}$ of the reactive powers of the compensation devices in each wind farm respectively, and steps S102-S107 are repeated to perform a time iteration.

At step S107, the upper limit voltage and the lower limit voltage of the output bus of each wind farm are defined as a safe threshold of each wind farm, if the voltage error is less than or equal to the predetermined threshold if the voltage error is less than or equal to the predetermined threshold.

The upper limit voltage of the output bus of each wind farm is defined as an upper limit of the safe threshold of each wind farm, and the lower limit voltage of the output bus of each wind farm is defined as a lower limit of the safe threshold of each wind farm.

Figure 2:
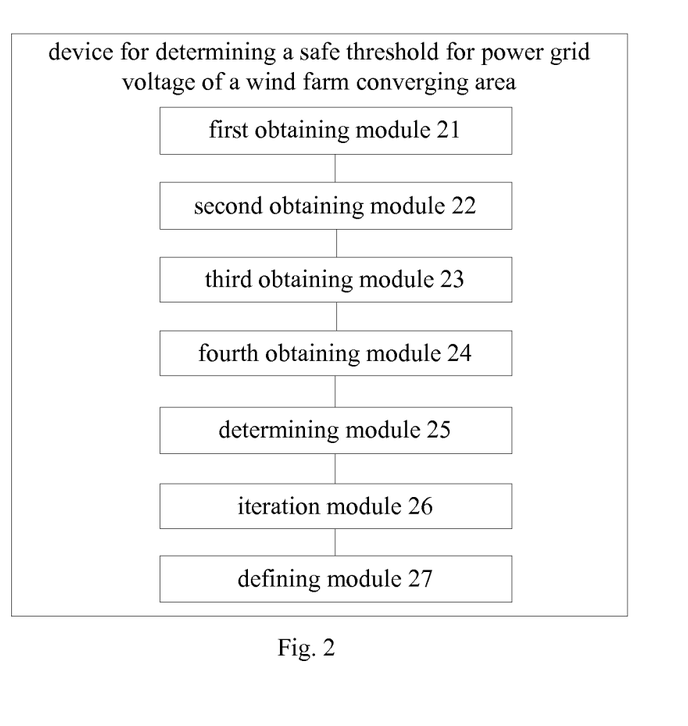
FIG. 2 is a block diagram of the device for determining a safe threshold for power grid voltage of a wind farm converging area according to embodiments of the present disclosure.

FIG. 2 is a block diagram of the device for determining a safe threshold for power grid voltage of a wind farm converging area according to embodiments of the present disclosure. As shown in FIG. 2, the device includes: a first obtaining module 21, a second obtaining module 22, a third obtaining module 23, a fourth obtaining module 24, a determining module 25, an iteration module 26 and a defining module 27.

The first obtaining module 21 is configured to obtain a ground state voltage of an output bus of each wind farm in the wind farm converging area.

The second obtaining module 22 is configured to obtain an upper limit voltage and a lower limit voltage of the output bus of each wind farm, a first lower limit and a first upper limit of reactive powers of fans in each wind farm, a first lower limit and a first upper limit of reactive powers of compensation devices in each wind farm, and a lower limit and an upper limit of active power fluctuations of the fans in each wind farm according to the ground state voltage of the output bus of each wind farm.

The third obtaining module 23 is configured to a second lower limit and a second upper limit of the reactive powers of the fans in each wind farm, a second lower limit and a second upper limit of the reactive powers of the compensation devices in each wind farm according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm.

The fourth obtaining module 24 is configured to obtain a voltage error according to the upper limit voltage and the lower limit voltage of the output bus of each wind farm.

The determining module 25 is configured to determine whether the voltage error is greater than a predetermined threshold.

The iteration module 26 is configured to replace the first lower limit and the first upper limit of the reactive powers of the fans in each wind farm, and the first lower limit and the first upper limit of the reactive powers of the compensation devices in each wind farm with the second lower limit and the second upper limit of the reactive powers of the fans in each wind farm, the second lower limit and the second upper limit of the reactive powers of the compensation devices in each wind farm respectively, and to repeat to perform a time iteration, if the voltage error is greater than the predetermined threshold.

The defining module 27 is configured to define the upper limit voltage and the lower limit voltage of the output bus of each wind farm as a safe threshold of each wind farm, if the voltage error is less than or equal to the predetermined threshold.

In an embodiment, the first obtaining module 21 includes: a setting unit and a first obtaining unit. The a setting unit configured to set each reactive power of each fan in each wind farm to be 0, and to set each reactive power of each compensation device in each wind farm to be 0; a first obtaining unit is configured to obtain the ground state voltage of the output bus of each wind farm by performing a ground state flow power calculation.

In an embodiment, the second obtaining module 22 includes: a first establishing unit, a first determining unit, a first calculating unit and a first resolving unit.

The first establishing unit is configured to establish a first objective function (1) of the upper limit voltage of the output bus of each wind farm and a second objective function (2) of the lower limit voltage of the output bus of each wind farm:

$$\overline{V_{PCC,i}} = \min_{\Delta p_{w_i}} \max_{\Delta q_{w_i}, \Delta q_{c_i}} V^0_{PCC,i} + \tag{1}$$

$$\sum_{j \in w_i} \left( \frac{\partial V^0_{PCC,i}}{\partial p_{i,j}} \Delta p_{i,j} + \frac{\partial V^0_{PCC,i}}{\partial q_{i,j}} \Delta q_{i,j} \right) + \sum_{j \in c_i} \frac{\partial V^0_{PCC,i}}{\partial q_{i,k}} \Delta q_{i,k}$$

$$\underline{V_{PCC,i}} = \max_{\Delta p_{w_i}} \min_{\Delta q_{w_i}, \Delta q_{c_i}} V^0_{PCC,i} + \tag{2}$$

$$\sum_{j \in w_i} \left( \frac{\partial V^0_{PCC,i}}{\partial p_{i,j}} \Delta p_{i,j} + \frac{\partial V^0_{PCC,i}}{\partial q_{i,j}} \Delta q_{i,j} \right) + \sum_{k \in c_i} \frac{\partial V^0_{PCC,i}}{\partial q_{i,k}} \Delta q_{i,k}$$

where $\overline{V_{PCC,i}}$ is an upper limit voltage of the output bus of a $i^{th}$ wind farm, $\underline{V_{PCC,i}}$ is a lower limit voltage of the output bus of the $i^{th}$ wind farm, $V_{PCC,i}^0$ is a ground state of the $i^{th}$ wind farm, $w_i$ is a set of fans in the $i^{th}$ wind farm, $c_i$ is a set of compensation devices in the $i^{th}$ wind farm, $$\frac{\partial V^0_{PCC,i}}{\partial p_{i,j}} \text{ and } \frac{\partial V^0_{PCC,i}}{\partial q_{i,j}}$$

represent a voltage sensitivity coefficient of an active power of a $j^{th}$ fan in the $i^{th}$ wind farm relative to $V_{PCC,i}^0$ and a voltage sensitivity coefficient of a reactive power of the $j^{th}$ fan in the $i^{th}$ wind farm relative to $V_{PCC,i}^0$ respectively, $$\frac{\partial V^0_{PCC,i}}{\partial q_{i,k}}$$

represents a voltage sensitivity coefficient of a reactive power of a $k^{th}$ compensation device in the $i^{th}$ wind farm relative to $V_{PCC,i}^0$, $\Delta p_{i,j}$ and $\Delta q_{i,j}$ represent a variation of the active power of the $j^{th}$ fan in the $i^{th}$ wind farm and a variation of the reactive power of the $j^{th}$ fan in the $i^{th}$ wind farm respectively, $\Delta q_{i,k}$ represents a variation of the reactive power of the $k^{th}$ compensation device in the $i^{th}$ wind farm.

The first determining unit is configured to determine first boundary conditions (3) for the first objective function and the second objective function:

$$\text{s.t. } \underline{V^0_{i,t}} \leq V^0_{i,t} + \sum_{j \in w_i} \left( \frac{\partial V^0_{i,t}}{\partial p_{i,j}} \Delta p_{i,j} + \frac{\partial V^0_{i,t}}{\partial q_{i,j}} \Delta q_{i,j} \right) + \sum_{k \in c_i} \frac{\partial V^0_{i,t}}{\partial q_{i,k}} \Delta q_{i,k} \leq \tag{3}$$

$$\overline{V^0_{i,t}}, t \in w_i$$

$$\underline{\Delta p_{i,t}} \leq \Delta p_{i,t} \leq \overline{\Delta p_{i,t}}, t \in w_i$$

$$\underline{\Delta q_{i,t}} \leq \Delta q_{i,t} \leq \overline{\Delta q_{i,t}}, t \in w_i$$

$$\underline{\Delta q_{i,k}} \leq \Delta q_{i,k} \leq \overline{\Delta q_{i,k}}, k \in c_i$$

$$\underline{\Delta Q_{wi}} \leq \sum_{t \in w_i} \Delta q_{i,t} \leq \overline{\Delta Q_{wi}}$$

$$\underline{\Delta Q_{ci}} \leq \sum_{k \in c_i} \Delta q_{i,k} \leq \overline{\Delta Q_{ci}}$$

where $\underline{V_{i,t}^0}$ and $\overline{V_{i,t}^0}$ represent a lower limit voltage and upper limit voltage in a normal operation of a $t^{th}$ fan in the $i^{th}$ wind farm respectively, $t \neq j$, $$\frac{\partial V_{i,t}^0}{\partial p_{i,j}} \text{ and } \frac{\partial V_{i,t}^0}{\partial q_{i,j}}$$

represent a voltage sensitivity coefficient of the active power of the $j^{th}$ fan in the $i^{th}$ wind farm relative to the $t^{th}$ fan and a voltage sensitivity coefficient of the reactive power of the $j^{th}$ fan in the $i^{th}$ wind farm relative to the $t^{th}$ fan respectively, $$\frac{\partial V_{i,t}^0}{\partial q_{i,k}}$$

represents a voltage sensitivity coefficient of the reactive power of the $k^{th}$ compensation device in the $i^{th}$ wind farm relative to the $t^{th}$ fan, $\underline{\Delta p_{i,t}}$ and $\overline{\Delta p_{i,t}}$ represent a lower limit and an upper limit of an active power fluctuation of the $t^{th}$ fan in the $i^{th}$ wind farm respectively, $\underline{\Delta q_{i,t}}$ and $\overline{\Delta q_{i,t}}$ represent a lower limit and an upper limit of a reactive power fluctuation of the $t^{th}$ fan in the $i^{th}$ wind farm respectively, $\underline{\Delta q_{i,k}}$ and $\overline{\Delta q_{i,k}}$ represent a lower limit and an upper limit of a reactive power fluctuation of the $k^{th}$ compensation device in the $i^{th}$ wind farm respectively, $\underline{\Delta Q_{wi}}$ and $\overline{\Delta Q_{wi}}$ represent a lower limit and an upper limit of reactive powers of fans in the $i^{th}$ wind farm, $\underline{\Delta Q_{ci}}$ and $\overline{\Delta Q_{ci}}$ represent a lower limit and an upper limit of reactive powers of compensation devices in the $i^{th}$ wind farm.

The first calculating unit is configured to calculate a lower limit of the active power fluctuation of the $i^{th}$ wind farm according to formula (4):

$$\underline{\Delta P_i} = \sum_{t \in w_i} \underline{\Delta p_{i,t}}, \qquad (4)$$

and to calculate an upper limit of the active power fluctuation of the $i^{th}$ wind farm according to formula (5):

$$\overline{\Delta P_i} = \sum_{t \in w_i} \overline{\Delta p_{i,t}}, \qquad (5)$$

where $\underline{\Delta P_i}$ and $\overline{\Delta P_i}$ represent the lower limit and the upper limit of the active power fluctuation of the $i^{th}$ wind farm respectively.

The first resolving unit is configured to resolve the first objective function and the second objective function based on the first boundary conditions to obtain the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm.

In an embodiment, the third obtaining module 23 includes: a second establishing unit, a second determining unit and a second resolving unit.

The second establishing unit is configured to establish a third objective function (6) of reactive power in the wind farm converging area according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuation of the fans in each wind farm:

$$\Delta Q = \max_{\Delta P} \min_{\Delta Q_{wi}, \Delta Q_{ci}} \sum_{i \in w} (\Delta Q_{wi}^{max} - \Delta Q_{wi}^{min}) + \sum_{i \in w} (\Delta Q_{ci}^{max} - \Delta Q_{ci}^{min}) \qquad (6)$$

where $\Delta Q_{wi}^{max}$ and $\Delta Q_{wi}^{min}$ represent a second lower limit and a second upper limit of reactive powers of fans in the $i^{th}$ wind farm, $\Delta Q_{ci}^{max}$ and $\Delta Q_{ci}^{min}$ represent a second lower limit and a second upper limit of reactive powers of compensation devices in the $i^{th}$ wind farm;

The second determining unit is configured to determine second boundary conditions (7) for the third objective function:

$$\text{s.t. } \underline{V_{PCC,i}} \leq V_{PCC,i}^0 + \sum_{n \in w_i} \left( \frac{\partial V_{PCC,i}^0}{\partial P_{i,n}} \Delta P_n + \frac{\partial V_{PCC,i}^0}{\partial Q_{i,n}} \Delta Q_n \right) \leq \overline{V_{PCC,i}}, i \in w \qquad (7)$$

$$V_{PCC,i} \leq V_{PCC,i}^0 + \sum_{n \in w, n \neq s} \left( \frac{\partial V_{PCC,i}^0}{\partial P_n} \Delta P_n + \frac{\partial V_{PCC,i}^0}{\partial Q_n} \Delta Q_n \right) +$$

$$\frac{\partial V_{PCC,i}^0}{\partial P_s} \Delta P_s^s + \frac{\partial V_{PCC,i}^0}{\partial Q_s} \Delta Q_s^s \leq \overline{V_{PCC,i}}, i \in w, i \neq s, \in S$$

$$\underline{\Delta P_i} \leq \Delta P_i \leq \overline{\Delta P_i}, i \in w$$

$$\underline{\Delta Q_{wi}} \leq \Delta Q_{wi}^{min} \leq \Delta Q_{wi} \leq \Delta Q_{wi}^{max} \leq \overline{\Delta Q_{wi}}, i \in w$$

$$\underline{\Delta Q_{ci}} \leq \Delta Q_{ci}^{min} \leq \Delta Q_{ci} \leq \Delta Q_{ci}^{max} \leq \overline{\Delta Q_{ci}}, i \in w$$

where $$\frac{\partial V_{PCC,i}^0}{\partial P_n} \text{ and } \frac{\partial V_{PCC,i}^0}{\partial Q_n}$$

represent a voltage sensitivity coefficient of an active power of a $n^{th}$ wind farm relative to the output bus of the $i^{th}$ wind farm and a voltage sensitivity coefficient of a reactive power of the $n^{th}$ wind farm relative to the output bus of the $i^{th}$ wind farm respectively, $\Delta P_n$ and $\Delta Q_n$ represent a variation of the active power of the $n^{th}$ wind farm and a variation of the reactive power of the $n^{th}$ wind farm respectively, n≠i, w is a set of wind farms in the wind farm converging area, S is a set of tripped off wind farms, $\Delta P_s^s$ and $\Delta Q_s^s$ represent a variation of active powers of tripped off wind farms and a variation of reactive powers of tripped off wind farms respectively;

The second resolving unit is configured to resolve the third objective function based on the second boundary conditions to obtain the second lower limit and the second upper limit of the reactive powers of the fans in each wind farm, the second lower limit and the second upper limit of the reactive powers of the compensation devices in each wind farm.

In an embodiment, the fourth obtaining module is further configured to obtain the voltage error according to formula (8):

$$\Delta V_S = \sum_{i \in w} |\overline{V_{PCC,i}^{(m+1)}} - \overline{V_{PCC,i}^{(m)}}| + \sum_{i \in w} |\underline{V_{PCC,i}^{(m+1)}} - \underline{V_{PCC,i}^{(m)}}| \quad (8)$$

where $\overline{V_{PCC,i}}^{(m)}$ is an upper limit voltage of the output bus of the $i^{th}$ wind farm in a $m^{th}$ time iteration and $\underline{V_{PCC,i}}^{(m)}$ is a lower limit voltage of the output bus of the $i^{th}$ wind farm in the $m^{th}$ time iteration.

The present disclosure provides a computer readable storage medium, comprising a computer program for executing a method for determining a safe threshold for power grid voltage of a wind farm converging area, in which the method includes:

step A: obtaining a ground state voltage of an output bus of each wind farm in the wind farm converging area;

step B: obtaining an upper limit voltage and a lower limit voltage of the output bus of each wind farm, a first lower limit and a first upper limit of reactive powers of fans in each wind farm, a first lower limit and a first upper limit of reactive powers of compensation devices in each wind farm, and a lower limit and an upper limit of active power fluctuations of the fans in each wind farm according to the ground state voltage of the output bus of each wind farm;

step C: obtaining a second lower limit and a second upper limit of the reactive powers of the fans in each wind farm, a second lower limit and a second upper limit of the reactive powers of the compensation devices in each wind farm according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm;

step D: obtaining a voltage error according to the upper limit voltage and the lower limit voltage of the output bus of each wind farm;

step E: determining whether the voltage error is greater than a predetermined threshold;

step F: replacing the first lower limit and the first upper limit of the reactive powers of the fans in each wind farm, and the first lower limit and the first upper limit of the reactive powers of the compensation devices in each wind farm with the second lower limit and the second upper limit of the reactive powers of the fans in each wind farm, the second lower limit and the second upper limit of the reactive powers of the compensation devices in each wind farm respectively, and repeating steps B-F to perform a time iteration, if the voltage error is greater than the predetermined threshold;

step G: defining the upper limit voltage and the lower limit voltage of the output bus of each wind farm as a safe threshold of each wind farm, if the voltage error is less than or equal to the predetermined threshold.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for determining a safe threshold for power grid voltage of a wind farm converging area and for controlling the power grid voltage of the wind farm converging area, which includes a plurality of wind farms, comprising the following acts performed by an automatic voltage control system of the power grid:

step A: calculating and obtaining, by an automatic control system of each wind farm, a ground state voltage of an output bus of each wind farm in the wind farm converging area, wherein the automatic control system of each wind farm includes at least one processor;

step B: calculating and obtaining, by the automatic control system of each wind farm, an upper limit voltage and a lower limit voltage of the output bus of each wind farm, a first lower limit and a first upper limit of reactive powers of fans in each wind farm, a first lower limit and a first upper limit of reactive powers of compensation devices in each wind farm, and a lower limit and an upper limit of active power fluctuations of the fans in each wind farm according to the ground state voltage of the output bus of each wind farm, wherein the automatic control system of each wind farm sends obtained data to a central automatic control system of the wind farm converging area, the obtained data includes the first lower limit and the first upper limit of reactive powers of fans in each wind farm, the first lower limit and the first upper limit of reactive powers of compensation devices in each wind farm, and the lower limit and the upper limit of active power fluctuations of the fans in each wind farm according to the ground state voltage of the output bus of each wind farm, and the central automatic control system includes at least one processor;

step C: calculating and obtaining, by the central automatic control system of the wind farm converging area, a second lower limit and a second upper limit of the reactive powers of the fans in each wind farm, a second lower limit and a second upper limit of the reactive powers of the compensation devices in each wind farm according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm;

step D: calculating and obtaining, by the central automatic control system of the wind farm converging area, a voltage error according to the upper limit voltage and the lower limit voltage of the output bus of each wind farm;

step E: determining, by the central automatic control system of the wind farm converging area, whether the voltage error is greater than a predetermined threshold;

step F: if the voltage error is greater than the predetermined threshold, the central automatic control system of the wind farm converging area sending data obtained from step C including the second lower limit and the second upper limit of the reactive powers of the fans in each wind farm, the second lower limit and the second upper limit of the reactive powers of the compensation devices in each wind farm, to the automatic control system of each wind farm, the automatic control system of each wind farm replacing the first lower limit and the first upper limit of the reactive powers of the fans in each wind farm, and the first lower limit and the first upper limit of the reactive powers of the compensation devices in each wind farm with the second lower limit and the second upper limit of the reactive powers of the fans in each wind farm, the second lower limit and the second upper limit of the reactive powers of the compensation devices in each wind farm respectively, and repeating steps B-F to perform a time iteration, if the voltage error is greater than the predetermined threshold;

step G: defining, by the central automatic control system of the wind farm converging area, the upper limit voltage and the lower limit voltage of the output bus of each wind farm as a safe threshold of each wind farm, if the voltage error is less than or equal to the predetermined threshold, and the central automatic control system of the wind farm converging area sending the upper limit voltage and the lower limit voltage of the output bus of each wind farm to the automatic control system of each wind farm; and step H, the automatic control system of each wind farm controlling voltage of its output bus in the range between the upper limit voltage and the lower limit voltage.

2. The method according to claim 1, wherein step A comprises:

setting each reactive power of each fan in each wind farm to be 0, and setting each reactive power of each compensation device in each wind farm to be 0;

obtaining the ground state voltage of the output bus of each wind farm by performing a ground state flow power calculation.

3. The method according to claim 1, wherein step B comprises:

establishing a first objective function (1) of the upper limit voltage of the output bus of each wind farm and a second objective function (2) of the lower limit voltage of the output bus of each wind farm:

$$\overline{V_{PCC,i}} = \min_{\Delta p_{w_i} \Delta q_{w_i} \Delta q_{c_i}} \max V_{PCC,i}^0 + \tag{1}$$

$$\sum_{j \in w_i} \left( \frac{\partial V_{PCC,i}^0}{\partial p_{i,j}} \Delta p_{i,j} + \frac{\partial V_{PCC,i}^0}{\partial q_{i,j}} \Delta q_{i,j} \right) + \sum_{j \in c_i} \frac{\partial V_{PCC,i}^0}{\partial q_{i,k}} \Delta q_{i,k}$$

$$\underline{V_{PCC,i}} = \max_{\Delta p_{w_i} \Delta q_{w_i} \Delta q_{c_i}} \min V_{PCC,i}^0 + \tag{2}$$

$$\sum_{j \in w_i} \left( \frac{\partial V_{PCC,i}^0}{\partial p_{i,j}} \Delta p_{i,j} + \frac{\partial V_{PCC,i}^0}{\partial q_{i,j}} \Delta q_{i,j} \right) + \sum_{k \in c_i} \frac{\partial V_{PCC,i}^0}{\partial q_{i,k}} \Delta q_{i,k}$$

where $\overline{V_{PCC,i}}$ is an upper limit voltage of the output bus of a $i^{th}$ wind farm, $\underline{V_{PCC,i}}$ is a lower limit voltage of the output bus of the $i^{th}$ wind farm, $V_{PCC,i}^0$ is a ground state of the $i^{th}$ wind farm, $w_i$ is a set of fans in the $i^{th}$ wind farm, $c_i$ is a set of compensation devices in the $i^{th}$ wind farm, $$\frac{\partial V_{PCC,i}^0}{\partial p_{i,j}} \text{ and } \frac{\partial V_{PCC,i}^0}{\partial q_{i,j}}$$

represent a voltage sensitivity coefficient of an active power of a $j_{th}$ fan in the $i^{th}$ wind farm relative to $V_{PCC,i}^0$ and a voltage sensitivity coefficient of a reactive power of the $j^{th}$ fan in the $i^{th}$ wind farm relative to $V_{PCC,i}^0$ respectively, $$\frac{\partial V_{PCC,i}^0}{\partial q_{i,k}}$$

represents a voltage sensitivity coefficient of a reactive power of a $k^{th}$ compensation device in the $i^{th}$ wind farm relative to $V_{PCC,i}^0$, $\Delta p_{i,j}$ and $\Delta q_{i,j}$ represent a variation of the active power of the $j^{th}$ fan in the $i^{th}$ wind farm and a variation of the reactive power of the $j^{th}$ fan in the $i^{th}$ wind farm respectively, $\Delta q_{i,k}$ represents a variation of the reactive power of the $k^{th}$ compensation device in the $i^{th}$ wind farm;

determining first boundary conditions (3) for the first objective function and the second objective function:

$$\text{s.t. } \underline{V_{i,t}^0} \leq V_{i,t}^0 + \sum_{j \in w_i} \left( \frac{\partial V_{i,t}^0}{\partial p_{i,j}} \Delta p_{i,j} + \frac{\partial V_{i,t}^0}{\partial q_{i,j}} \Delta q_{i,j} \right) + \tag{3}$$

$$\sum_{k \in c_i} \frac{\partial V_{i,t}^0}{\partial q_{i,k}} \Delta q_{i,k} \leq \overline{V_{i,t}^0}, t \in w_i$$

$$\underline{\Delta p_{i,t}} \leq \Delta p_{i,t} \leq \overline{\Delta p_{i,t}}, t \in w_i$$

$$\underline{\Delta q_{i,t}} \leq \Delta q_{i,t} \leq \overline{\Delta q_{i,t}}, t \in w_i$$

$$\underline{\Delta q_{i,k}} \leq \Delta q_{i,k} \leq \overline{\Delta q_{i,k}}, k \in c_i$$

$$\underline{\Delta Q_{wi}} \leq \sum_{t \in w_i} \Delta q_{i,t} \leq \overline{\Delta Q_{wi}}$$

$$\underline{\Delta Q_{ci}} \leq \sum_{k \in c_i} \Delta q_{i,k} \leq \overline{\Delta Q_{ci}}$$

where $\underline{V_{i,t}^0}$ and $\overline{V_{i,t}^0}$ represent a lower limit voltage and upper limit voltage in a normal operation of a $t^{th}$ fan in the $i^{th}$ wind farm respectively, $t \neq j$, $$\frac{\partial V_{i,t}^0}{\partial p_{i,j}} \text{ and } \frac{\partial V_{i,t}^0}{\partial q_{i,j}}$$

represent a voltage sensitivity coefficient of the active power of the $j^{th}$ fan in the $i^{th}$ wind farm relative to the $t^{th}$ fan and a voltage sensitivity coefficient of the reactive power of the $j^{th}$ fan in the $i^{th}$ wind farm relative to the $t^{th}$ fan respectively, $$\frac{\partial V_{i,t}^0}{\partial q_{i,k}}$$

represents a voltage sensitivity coefficient of the reactive power of the $k^{th}$ compensation device in the $i^{th}$ wind farm relative to the $t^{th}$ fan, $\underline{\Delta p_{i,t}}$ and $\overline{\Delta p_{i,t}}$ represent a lower limit and an upper limit of an active power fluctuation of the $t^{th}$ fan in the $i^{th}$ wind farm respectively, $\underline{\Delta q_{i,t}}$ and $\overline{\Delta q_{i,t}}$ represent a lower limit and an upper limit of a reactive power fluctuation of the $t^{th}$ fan in the $i^{th}$ wind farm respectively, $\underline{\Delta q_{i,k}}$ and $\overline{\Delta q_{i,k}}$ represent a lower limit and an upper limit of a reactive power fluctuation of the $k^{th}$ compensation device in the $i^{th}$ wind farm respectively, $\underline{\Delta Q_{wi}}$ and $\overline{\Delta Q_{wi}}$ represent a lower limit and an upper limit of reactive powers of fans in the $i^{th}$ wind farm, $\underline{\Delta Q_{ci}}$ and $\overline{\Delta Q_{ci}}$ represent a lower limit and an upper limit of reactive powers of compensation devices in the $i^{th}$ wind farm;

calculating a lower limit of the active power fluctuation of the $i^{th}$ wind farm according to formula (4):

$$\underline{\Delta P_i} = \sum_{t \in w_i} \underline{\Delta p_{i,t}}, \tag{4}$$

and calculating an upper limit of the active power fluctuation of the $i^{th}$ wind farm according to formula (5):

$$\overline{\Delta P_i} = \sum_{t \in w_i} \overline{\Delta p_{i,t}}, \quad (5)$$

where $\underline{\Delta P_i}$, and $\overline{\Delta P_i}$ represent the lower limit and the upper limit of the active power fluctuation of the $i^{th}$ wind farm respectively;

resolving the first objective function and the second objective function based on the first boundary conditions to obtain the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm.

4. The method according to claim 3, wherein step C comprises:

establishing a third objective function (6) of reactive power in the wind farm converging area according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuation of the fans in each wind farm:

$$\Delta Q = \max_{\Delta P} \min_{\Delta Q_{wi}, \Delta Q_{ci}} \sum_{i \in w} (\Delta Q_{wi}^{max} - \Delta Q_{wi}^{min}) + \sum_{i \in w} (\Delta Q_{ci}^{max} - \Delta Q_{ci}^{min}) \quad (6)$$

where $\Delta Q_{wi}^{max}$ and $\Delta Q_{wi}^{min}$ represent a second lower limit and a second upper limit of reactive powers of fans in the $i^{th}$ wind farm, $\Delta Q_{ci}^{max}$ and $\Delta Q_{ci}^{min}$ represent a second lower limit and a second upper limit of reactive powers of compensation devices in the $i^{th}$ wind farm;

determining second boundary conditions (7) for the third objective function:

$$\text{s.t. } \underline{V_{PCC,i}} \leq V_{PCC,i}^0 + \sum_{n \in w_i} \left( \frac{\partial V_{PCC,i}^0}{\partial P_{i,n}} \Delta P_n + \frac{\partial V_{PCC,i}^0}{\partial Q_{i,n}} \Delta Q_n \right) \leq \overline{V_{PCC,i}}, \, i \in w \quad (7)$$

$$\underline{V_{PCC,i}} \leq V_{PCC,i}^0 + \sum_{n \in w, n \neq s} \left( \frac{\partial V_{PCC,i}^0}{\partial P_n} \Delta P_n + \frac{\partial V_{PCC,i}^0}{\partial Q_n} \Delta Q_n \right) +$$

$$\frac{\partial V_{PCC,i}^0}{\partial P_s} \Delta P_s^s + \frac{\partial V_{PCC,i}^0}{\partial Q_s} \Delta Q_s^s \leq \overline{V_{PCC,i}}, \, i \in w, i \neq s, \in S$$

$$\underline{\Delta P_i} \leq \Delta P_i \leq \overline{\Delta P_i}, \quad i \in w$$

$$\underline{\Delta Q_{wi}} \leq \Delta Q_{wi}^{min} \leq \Delta Q_{wi} \leq \Delta Q_{wi}^{max} \leq \overline{\Delta Q_{wi}}, \quad i \in w$$

$$\underline{\Delta Q_{ci}} \leq \Delta Q_{ci}^{min} \leq \Delta Q_{ci} \leq \Delta Q_{ci}^{max} \leq \overline{\Delta Q_{ci}}, \quad i \in w$$

where $$\frac{\partial V_{PCC,i}^0}{\partial P_n} \text{ and } \frac{\partial V_{PCC,i}^0}{\partial Q_n}$$

represent a voltage sensitivity coefficient of an active power of a $n^{th}$ wind farm relative to the output bus of the $i^{th}$ wind farm and a voltage sensitivity coefficient of a reactive power of the $n^{th}$ wind farm relative to the output bus of the $i^{th}$ wind farm respectively, $\Delta P_n$ and $\Delta Q_n$ represent a variation of the active power of the $n^{th}$ wind farm and a variation of the reactive power of the $n^{th}$ wind farm respectively, n≠i, w is a set of wind farms in the wind farm converging area, S is a set of tripped off wind farms, $\Delta P_s^s$ and $\Delta Q_s^s$ represent a variation of active powers of tripped off wind farms and a variation of reactive powers of tripped off wind farms respectively;

resolving the third objective function based on the second boundary conditions to obtain the second lower limit and the second upper limit of the reactive powers of the fans in each wind farm, the second lower limit and the second upper limit of the reactive powers of the compensation devices in each wind farm.

5. The method according to claim 4, wherein obtaining the voltage error according to formula (8):

$$\Delta V_S = \sum_{i \in w} \left| \overline{V_{PCC,i}^{(m+1)}} - \overline{V_{PCC,i}^{(m)}} \right| + \sum_{i \in w} \left| \underline{V_{PCC,i}^{(m+1)}} - \underline{V_{PCC,i}^{(m)}} \right| \quad (8)$$

where $\overline{V_{PCC,i}^{(m)}}$ is an upper limit voltage of the output bus of the $i^{th}$ wind farm in a $m^{th}$ time iteration and $\underline{V_{PCC,i}^{(m)}}$ is a lower limit voltage of the output bus of the $i^{th}$ wind farm in the $m^{th}$ time iteration.

6. A system for determining a safe threshold for power grid voltage of a wind farm converging area which includes a plurality of wind farms, comprising:

a non-transitory computer-readable medium comprising computer-executable instructions stored thereon; and an instruction execution system including at least one processor, which is configured by the instructions to implement at least one of following modules:

a first obtaining module installed at an automatic control system in each wind farm, configured to obtain a ground state voltage of an output bus of each wind farm in the wind farm converging area;

a second obtaining module installed at the automatic control system in each wind farm, configured to obtain an upper limit voltage and a lower limit voltage of the output bus of each wind farm, a first lower limit and a first upper limit of reactive powers of fans in each wind farm, a first lower limit and a first upper limit of reactive powers of compensation devices in each wind farm, and a lower limit and an upper limit of active power fluctuations of the fans in each wind farm according to the ground state voltage of the output bus of each wind farm;

a first transmitting module installed in each wind farm, configured to send obtained data including the upper limit voltage and the lower limit voltage of the output bus of each wind farm, the first lower limit and the first upper limit of reactive powers of fans in each wind farm, the first lower limit and the first upper limit of reactive powers of compensation devices in each wind farm, and the lower limit and the upper limit of active power fluctuations of the fans in each wind farm to a central automatic control system of the wind farm converging area, a third obtaining module installed at the central automatic control system of the wind farm converging area, configured to obtain a second lower limit and a second upper limit of the reactive powers of the fans in each wind farm, a second lower limit and a second upper limit of the reactive powers of the compensation devices in each wind farm according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm;

a fourth obtaining module installed at the central automatic control system of the wind farm converging area, configured to obtain a voltage error according to the upper limit voltage and the lower limit voltage of the output bus of each wind farm;

a determining module installed at the central automatic control system of the wind farm converging area, configured to determine whether the voltage error is greater than a predetermined threshold;

a second transmitting module installed at the central automatic control system of the wind farm converging area, configured to send data including the second lower limit and the second upper limit of the reactive powers of the fans in each wind farm, the second lower limit and the second upper limit of the reactive powers of the compensation devices in each wind farm to the automatic control system in each wind farm; if the voltage error is greater than the predetermined threshold;

an iteration module, configured to replace the first lower limit and the first upper limit of the reactive powers of the fans in each wind farm, and the first lower limit and the first upper limit of the reactive powers of the compensation devices in each wind farm with the second lower limit and the second upper limit of the reactive powers of the fans in each wind farm, the second lower limit and the second upper limit of the reactive powers of the compensation devices in each wind farm respectively, and to repeat to perform a time iteration, if the voltage error is greater than the predetermined threshold;

a defining module, configured to define the upper limit voltage and the lower limit voltage of the output bus of each wind farm as a safe threshold of each wind farm, if the voltage error is less than or equal to the predetermined threshold;

the second transmitting module sending information including the upper limit voltage and the lower limit voltage of the output bus of each wind farm to the automatic control system in each wind farm, the automatic control system of each wind farm controlling voltage of its output bus in the range between the upper limit voltage and the lower limit voltage.

7. The device according to claim 6, wherein the first obtaining module comprises:

a setting unit, configured to set each reactive power of each fan in each wind farm to be 0, and to set each reactive power of each compensation device in each wind farm to be 0;

a first obtaining unit, configured to obtain the ground state voltage of the output bus of each wind farm by performing a ground state flow power calculation.

8. The device according to claim 6, wherein the second obtaining module comprises:

a first establishing unit, configured to establish a first objective function (1) of the upper limit voltage of the output bus of each wind farm and a second objective function (2) of the lower limit voltage of the output bus of each wind farm:

$$\overline{V_{PCC,i}} = \min_{\Delta p_{w_i}} \max_{\Delta q_{w_i}, \Delta q_{c_i}} V_{PCC,i}^0 + \sum_{j \in w_i} \left( \frac{\partial V_{PCC,i}^0}{\partial p_{i,j}} \Delta p_{i,j} + \frac{\partial V_{PCC,i}^0}{\partial q_{i,j}} \Delta q_{i,j} \right) + \sum_{j \in c_i} \frac{\partial V_{PCC,i}^0}{\partial q_{i,k}} \Delta q_{i,k} \quad (1)$$

$$\underline{V_{PCC,i}} = \max_{\Delta p_{w_i}} \min_{\Delta q_{w_i}, \Delta q_{c_i}} V_{PCC,i}^0 + \sum_{j \in w_i} \left( \frac{\partial V_{PCC,i}^0}{\partial p_{i,j}} \Delta p_{i,j} + \frac{\partial V_{PCC,i}^0}{\partial q_{i,j}} \Delta q_{i,j} \right) + \sum_{k \in c_i} \frac{\partial V_{PCC,i}^0}{\partial q_{i,k}} \Delta q_{i,k} \quad (2)$$

where $\overline{V_{PCC,i}}$ is an upper limit voltage of the output bus of a $i^{th}$ wind farm, $\underline{V_{PCC,i}}$ is a lower limit voltage of the output bus of the $i^{th}$ wind farm, $V_{PCC,i}^0$ is a ground state of the $i^{th}$ wind farm, $w_i$ is a set of fans in the $i^{th}$ wind farm, $c_i$ is a set of compensation devices in the $i^{th}$ wind farm, $$\frac{\partial V_{PCC,i}^0}{\partial p_{i,j}} \text{ and } \frac{\partial V_{PCC,i}^0}{\partial q_{i,j}}$$

represent a voltage sensitivity coefficient of an active power of a $j^{th}$ fan in the $i^{th}$ wind farm relative to $V_{PCC,i}^0$ and a voltage sensitivity coefficient of a reactive power of the $j^{th}$ fan in the $i^{th}$ wind farm relative to $V_{PCC,i}^0$ respectively, $$\frac{\partial V_{PCC,i}^0}{\partial q_{i,k}}$$

represents a voltage sensitivity coefficient of a reactive power of a $k^{th}$ compensation device in the $i^{th}$ wind farm relative to $V_{PCC,i}^0$, $\Delta p_{i,j}$ and $\Delta q_{i,j}$ represent a variation of the active power of the $j^{th}$ fan in the $i^{th}$ wind farm and a variation of the reactive power of the $j^{th}$ fan in the $i^{th}$ wind farm respectively, $\Delta q_{i,k}$ represents a variation of the reactive power of the $k^{th}$ compensation device in the $i^{th}$ wind farm;

a first determining unit, configured to determine first boundary conditions (3) for the first objective function and the second objective function:

$$\text{s.t. } \underline{V_{i,t}^0} \leq V_{i,t}^0 + \sum_{j \in w_i} \left( \frac{\partial V_{i,t}^0}{\partial p_{i,j}} \Delta p_{i,j} + \frac{\partial V_{i,t}^0}{\partial q_{i,j}} \Delta q_{i,j} \right) + \sum_{k \in c_i} \frac{\partial V_{i,t}^0}{\partial q_{i,k}} \Delta q_{i,k} \leq \overline{V_{i,t}^0}, \, t \in w_i \quad (3)$$

$$\underline{\Delta p_{i,t}} \leq \Delta p_{i,t} \leq \overline{\Delta p_{i,t}}, \, t \in w_i$$

$$\underline{\Delta q_{i,t}} \leq \Delta q_{i,t} \leq \overline{\Delta q_{i,t}}, \, t \in w_i$$

$$\underline{\Delta q_{i,k}} \leq \Delta q_{i,k} \leq \overline{\Delta q_{i,k}}, \, k \in c_i$$

$$\underline{\Delta Q_{wi}} \leq \sum_{t \in w_i} \Delta q_{i,t} \leq \overline{\Delta Q_{w,i}}$$

$$\underline{\Delta Q_{ci}} \leq \sum_{k \in c_i} \Delta q_{i,k} \leq \overline{\Delta Q_{c,i}}$$

where $\underline{V_{i,t}^0}$ and $\overline{V_{i,t}^0}$ represent a lower limit voltage and upper limit voltage in a normal operation of a $t^{th}$ fan in the $i^{th}$ wind farm respectively, $t \neq j$, $$\frac{\partial V_{i,t}^0}{\partial p_{i,j}} \text{ and } \frac{\partial V_{i,t}^0}{\partial q_{i,j}}$$

represent a voltage sensitivity coefficient of the active power of the $j^{th}$ fan in the $i^{th}$ wind farm relative to the $t^{th}$ fan and a voltage sensitivity coefficient of the reactive power of the $j^{th}$ fan in the $i^{th}$ wind farm relative to the $t^{th}$ fan respectively, $$\frac{\partial V_{i,t}^0}{\partial q_{i,k}}$$

represents a voltage sensitivity coefficient of the reactive power of the $k^{th}$ compensation device in the $i^{th}$ wind farm relative to the $t^{th}$ fan, $\underline{\Delta p_{i,t}}$ and $\overline{\Delta p_{i,t}}$ represent a lower limit and an upper limit of an active power fluctuation of the $t^{th}$ fan in the $i^{th}$ wind farm respectively, $\underline{\Delta q_{i,t}}$ and $\overline{\Delta q_{i,t}}$ represent a lower limit and an upper limit of a reactive power fluctuation of the $t^{th}$ fan in the $i^{th}$ wind farm respectively, $\underline{\Delta q_{i,k}}$ and $\overline{\Delta q_{i,k}}$ represent a lower limit and an upper limit of a reactive power fluctuation of the $k^{th}$ compensation device in the $i^{th}$ wind farm respectively, $\underline{\Delta Q_{wi}}$ and $\overline{\Delta Q_{wi}}$ represent a lower limit and an upper limit of reactive powers of fans in the $i^{th}$ wind farm, $\underline{\Delta Q_{ci}}$ and $\overline{\Delta Q_{ci}}$ represent a lower limit and an upper limit of reactive powers of compensation devices in the $i^{th}$ wind farm;

a first calculating unit, configured to calculate a lower limit of the active power fluctuation of the $i^{th}$ wind farm according to formula (4):

$$\underline{\Delta P_i} \leq \sum_{t \in w_i} \underline{\Delta p_{i,t}}, \qquad (4)$$

and to calculate an upper limit of the active power fluctuation of the $i^{th}$ wind farm according to formula (5):

$$\overline{\Delta P_i} \leq \sum_{t \in w_i} \overline{\Delta p_{i,t}}, \qquad (5)$$

where $\underline{\Delta P_i}$ and $\overline{\Delta P_i}$ represent the lower limit and the upper limit of the active power fluctuation of the $i^{th}$ wind farm respectively;

a first resolving unit, configured to resolve the first objective function and the second objective function based on the first boundary conditions to obtain the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuations of the fans in each wind farm.

9. The device according to claim 8, wherein the third obtaining module comprises:

a second establishing unit, configured to establish a third objective function (6) of reactive power in the wind farm converging area according to the upper limit voltage and the lower limit voltage of the output bus of each wind farm, the first lower limit and the first upper limit of the reactive powers of the fans in each wind farm, the first lower limit and the first upper limit of the reactive powers of the compensation devices in each wind farm, and the lower limit and the upper limit of the active power fluctuation of the fans in each wind farm:

$$\Delta Q = \max_{\Delta P} \min_{\Delta Q_{wi}, \Delta Q_{ci}} \sum_{i \in w} (\Delta Q_{wi}^{max} - \Delta Q_{wi}^{min}) + \sum_{i \in w} (\Delta Q_{ci}^{max} - \Delta Q_{ci}^{min}) \qquad (6)$$

where $\Delta Q_{wi}^{max}$ and $\Delta Q_{wi}^{min}$ represent a second lower limit and a second upper limit of reactive powers of fans in the $i^{th}$ wind farm, $\Delta Q_{ci}^{max}$ and $\Delta Q_{ci}^{min}$ represent a second lower limit and a second upper limit of reactive powers of compensation devices in the $i^{th}$ wind farm;

a second determining unit, configured to determine second boundary conditions (7) for the third objective function:

$$\text{s.t. } \underline{V_{PCC,i}} \leq V_{PCC,i}^0 + \sum_{n \in w_i} \left( \frac{\partial V_{PCC,i}^0}{\partial P_{i,n}} \Delta P_n + \frac{\partial V_{PCC,i}^0}{\partial Q_{i,n}} \Delta Q_n \right) \leq \overline{V_{PCC,i}}, i \in w \qquad (7)$$

$$\underline{V_{PCC,i}} \leq V_{PCC,i}^0 + \sum_{n \in w, n \neq s} \left( \frac{\partial V_{PCC,i}^0}{\partial P_n} \Delta P_n + \frac{\partial V_{PCC,i}^0}{\partial Q_n} \Delta Q_n \right) +$$

$$\frac{\partial V_{PCC,i}^0}{\partial P_s} \Delta P_s^s + \frac{\partial V_{PCC,i}^0}{\partial Q_s} \Delta Q_s^s \leq \overline{V_{PCC,i}}, i \in w, i \neq s, \in S$$

$$\underline{\Delta P_i} \leq \Delta P_i \leq \overline{\Delta P_i}, \quad i \in w$$

$$\underline{\Delta Q_{wi}} \leq \Delta Q_{wi}^{min} \leq \Delta Q_{wi} \leq \Delta Q_{wi}^{max} \leq \overline{\Delta Q_{wi}}, \quad i \in w$$

$$\underline{\Delta Q_{ci}} \leq \Delta Q_{ci}^{min} \leq \Delta Q_{ci} \leq \Delta Q_{ci}^{max} \leq \overline{\Delta Q_{ci}}, \quad i \in w$$

where $$\frac{\partial V_{PCC,i}^0}{\partial P_n} \text{ and } \frac{\partial V_{PCC,i}^0}{\partial Q_n}$$

represent a voltage sensitivity coefficient of an active power of a $n^{th}$ wind farm relative to the output bus of the $i^{th}$ wind farm and a voltage sensitivity coefficient of a reactive power of the $n^{th}$ wind farm relative to the output bus of the $i^{th}$ wind farm respectively, $\Delta P_n$ and $\Delta Q_n$ represent a variation of the active power of the $n^{th}$ wind farm and a variation of the reactive power of the $n^{th}$ wind farm respectively, n≠i, w is a set of wind farms in the wind farm converging area, S is a set of tripped off wind farms, $\Delta P_s^s$ and $\Delta Q_s^s$ represent a variation of active powers of tripped off wind farms and a variation of reactive powers of tripped off wind farms respectively;

a second resolving unit, configured to resolve the third objective function based on the second boundary conditions to obtain the second lower limit and the second upper limit of the reactive powers of the fans in each wind farm, the second lower limit and the second upper limit of the reactive powers of the compensation devices in each wind farm.

10. The device according to claim 9, wherein the fourth obtaining module is further configured to obtain the voltage error according to formula (8):

$$\Delta V_S = \sum_{i \in w} |\overline{V_{PCC,i}^{(m+1)}} - \overline{V_{PCC,i}^{(m)}}| + \sum_{i \in w} |\underline{V_{PCC,i}^{(m+1)}} - \underline{V_{PCC,i}^{(m)}}| \quad (8)$$

where $\overline{\Delta V_{PCC,i}^{(m)}}$ is an upper limit voltage of the output bus of the $i^{th}$ wind farm in a $m^{th}$ time iteration and $\underline{\Delta V_{PCC,i}^{(m)}}$ is a lower limit voltage of the output bus of the $i^{th}$ wind farm in the $m^{th}$ time iteration.

\* \* \* \* \*